United States Patent Office 3,792,183
Patented Feb. 12, 1974

3,792,183
CEREAL COATING COMPOSITION AND PROCESS
Angus Alexander Lyall, Niagara Falls, Ontario, Canada, and Cecil Norton Lundy, Hawthorne, N.J., assignors to Nabisco, Inc., New York, N.Y.
Filed Aug. 10, 1971, Ser. No. 170,510
Int. Cl. A23l 1/10, 1/08
U.S. Cl. 426—307    24 Claims

ABSTRACT OF THE DISCLOSURE

A syrup solution containing, by weight, 60–85% sugar solids, is made up, and is applied to a cereal base without heating. The sugar solids comprise by weight, based on the total sugar solids, on a dry basis, from about 80% to about 68% sucrose solids and about 20–32% low dextrose equivalent glucose solids. After coating, the product is subjected to substantial heat in a dry apparatus for 20–28 minutes, and the drying is effected with substantial agitation of the coated cereal particles. A hard, glossy, non-hydroscopic transparent cereal coating is obtained which does not crystallize or decrease in glossiness even after extended shelf life.

---

Figure 1:
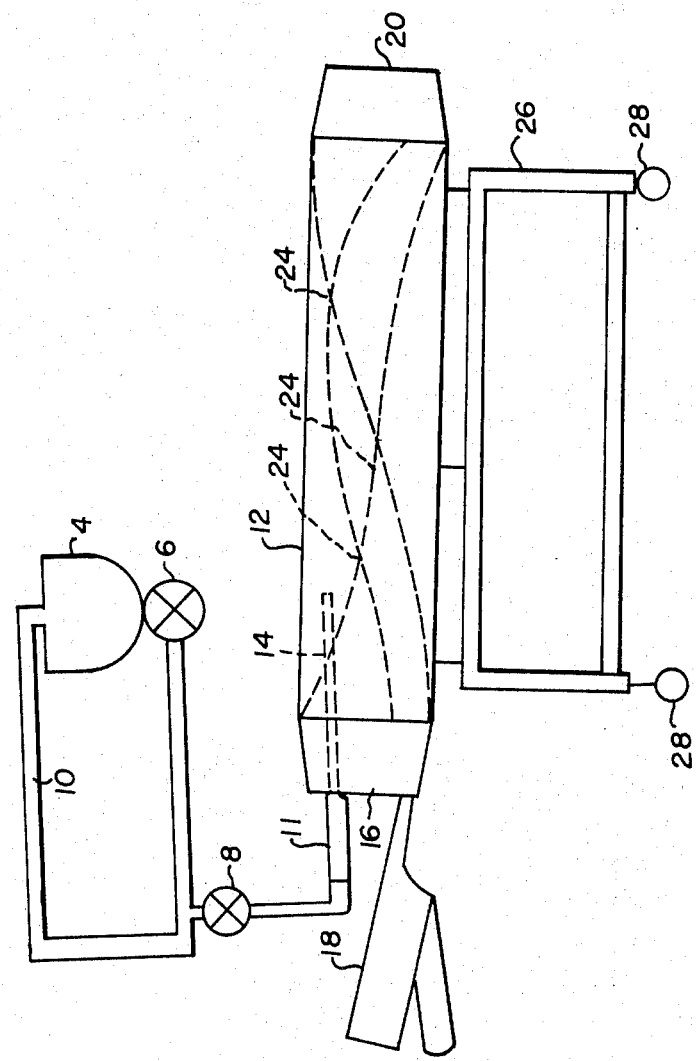

The present invention relates to the candy coating of cereal particles, and more particularly to the provision of a hard, transparent cereal candy coating which is not susceptible to moisture pick-up even under humid conditions.

It has been known to coat cereal particles with hard candy coatings, i.e., sugar compositions containing only from about 2% to about 6% moisture which can be liquefied by heating and which solidify on cooling into hard transparent coatings. Because of their low moisture content such compositions do not need to be dried, but on the other hand they require the addition of a substantial amount of invert sugar or other non-sucrose sugars and relatively high temperatures in order to ensure that the compositions are sufficiently fluid to apply to cereal particles. Sucrose crystallization is prevented by the invert sugar or other non-sucrose sugars used in the compositions, but in humid atmospheres such coatings absorb moisture and become very sticky, causing the cereal particles to agglomerate to an objectionable extent. An example of a previously known process of this type is disclosed in Canadian Pat. No. 528,802 of Massmann et al. wherein the candy coating contains from 3.0 to 6.5% moisture and is heated to a temperature of 320° F.–350° F. under pressure before being sprayed onto the cereal particles. Such a coating is very hydroscopic, and the coated cereals must be packed in special moisture-proof packages to minimize moisture pickup during storage.

Another approach which has been taken in dealing with the problem of candy coating food products including cereal flakes, is to utilize a sugar composition or candy pieces in the form of a finely comminuted free flowing powder. The cereal flakes are tumbled with a quantity of this powder while at the same time the mixture is subjected to a relatively high degree of heating to convert the free flowing powder to a molten candy which adheres to the surfaces of the cereal flakes. This process requires that the sugar or candy be in the form of a finely comminuted powder, which frequently necessitates that the sugar or candy be pulverized before use; and the heating can be applied only for a relatively short time to avoid damaging the food products. This, along with the fact that heating must be carried out simultaneously with the coating step, renders the process inconvenient to use, and limit the acceptability of the process.

Cereal particles have also been coated with sugar syrups containing about 35% water. These syrups are sufficiently fluid for application without the use of invert sugar or other non-sucrose solids, but must then be dried; and upon drying the sucrose crystallizes and the coating turns white or frosted. This crystallization can continue during storage of the product and result in an undesirable granular feel in the mouth when the product is consumed. For some purposes such frosted coatings have been acceptable, but frequently it is desired to have a clear, transparent coating which will not crystallize. To achieve this, it has heretofore normally been necessary to use a syrup containing invert sugar or other non-sucrose sugars for coating the cereal particles; but as previously mentioned, this gives a coating which is very hygroscopic, and the cereal becomes sticky under humid conditions with resultant agglomeration in the package.

A process has been described of coating cereal bodies with a hard transparent coating which does not become sticky under humid conditions. A syrup containing between 60% and 85% total sugars, of which between 1% and 8% by weight, on a dry basis, is non-sucrose sugars such as glucose, invert sugar or the like, is applied to cereal bodies in a suitable manner such as by tumbling or spraying. The coated cereal bodies are then dried to a final moisture content of about 2–3%. The above process, however, has certain disadvantages. With said process it is necessary that the drying, at least in its early stages, be carried out without substantial agitation of the coated cereal, to minimize the danger of crystallization of the candy coating; and a longer drying time, or higher temperature, or both, is necessary than would be the case if agitation, such as by a flow of air, can be carried out during drying. The temperature and time at which the drying is effected, in this process, must be rather carefully controlled to ensure that inversion of sugar occurring during the drying be kept to a level such that no more than 8% of the sugars in the dried coating be non-sucrose sugars. Moreover, rapid cooling of the hot coated cereal bodies, following the drying step, of the above process, is necessary to minimize agglomeration.

It is an objective of the present invention to provide a transparent, hard cereal coating and a process for applying it to cereals, in which the aforementioned disadvantages of known coatings and processes are substantially eliminated or at least greatly minimized.

Another objective of the present invention is the provision of a hard, glazed cereal candy coating which does not recrystallize or decrease in glossiness even after extended shelf life period; and a process for applying such a coating to cereal particles.

Another objective of this invention is the provision of a hard, transparent cereal candy coating which is not susceptible to moisture pickup even under humid conditions.

It has been found possible (and this is one aspect of the present invention) to provide cereal particles with a hard, transparent glossy coating which is non-hygroscopic by applying to the cereal particles a preheated aqueous syrup solution comprising from 60% to 85% by weight of sugar solids, in which the sugar solids are comprised of 80%–68% by weight, on a dry basis, of sucrose solids and 20%–32% by weight, on a dry basis, of low dextrose equivalent glucose solids; and then drying the coated cereal particles at a temperature and for a time such that discrete cereal particles, each having a hard glossy, non-hydroscopic, transparent candy coating, are obtained, while at the same time the particles are vigorously agitated throughout the drying step.

Another aspect of this invention resides in a composition for applying to cereal particles; this composition comprises an aqueous syrup solution containing 60%–85% by weight of sugar solids, with the sugar solids being comprised of 80%–68% by weight, on a dry basis, of sucrose solids and 20%–32% by weight, on a dry basis, of low dextrose equivalent glucose solids.

The invention, in still another aspect, resides in a process for preparing the foregoing composition, which comprises: forming an aqueous syrup solution by mixing together with heating, sugar solids comprised of 80%–68% by weight of sucrose solids and 20%–32% by weight of low dextrose equivalent glucose solids, and sufficient water to make up an aqueous syrup solution containing 60% to 85% by weight of said sugar solids. The syrup solution is then conditioned at a temperature in the range of 180° F. to 240° F.

The cereal particles which may be coated in accordance with this invention include all ready-to-eat cereal particles in flaked, shredded, puffed or other forms, such as corn flakes, shredded wheat, puffed wheat, puffed rice, bran flakes, wheat flakes, puffed corn, breakfast cereals in the form of extruded and puffed doughs and the like. Such cereal particles are prepared in the usual manner and may be either toasted or untoasted.

The sucrose content of the syrup to be preferred in any given case is governed to some extent by the nature of the cereal particles being coated. In the case of porous cereal particles such as puffed wheat and other gun puffed products, a syrup of higher concentration is desirable to reduce the amount absorbed into the cereal particles before a satisfactory external coating is obtained. Soaking into such porous cereal particles can be further reduced, if desired, by the use of thickeners such as dextrins, gums, methyl cellulose, carboxy methyl cellulose, dextran, gelatinized starches such as corn starch, waxy maize starch and tapioca starch (raw starches may also be employed where the conditions of use cause gelatinization), and the like. In the event that a thickener is used, the amount thereof to be added to the syrup would depend upon the concentration of the syrup, upon the nature of the cereal body and particularly its porosity, and also of course upon the particular thickener employed. Dextrins and corn syrup, for example, may be employed within the range of 0.5–10% (dry basis), above which the coating becomes sticky; whereas gums such as gum arabic, Irish moss, gum tragacanth and the like, and also methyl cellulose and carboxy methyl cellulose, may be employed within the range of 0.2–2%. With dextrin and the gelatinized starches the range is about 0.5–5%, the upper limit again being that at which the coating becomes sticky.

For porous cereal particles of the types mentioned above, therefore, syrups containing about 75–80% sugars or syrups in which an equivalent viscosity is obtained by using thickeners are preferred. For non-porous cereal particles, on the other hand, syrups containing about 60–70% sugars are sufficiently viscous without thickeners, but they can be used if desired.

By the term "glucose solids," as used in the present invention, is meant carbohydrate solids containing glucose such as are commercially obtained by the hydrolysis of starch in the presence of dilute acids. Such solids may also be termed "non-sucrose sugar solids."

By "low dextrose equivalent" (low D.E.) glucose solids, as employed in the present invention, we mean glucose solids having a dextrose equivalency of 15%–28%, based on the total weight of glucose solids. Preferably the dextrose equivalency of the glucose solids is in the range of 24%–28%, based on the total weight of such solids. Such solids are conveniently obtained by dehydrating now conversion corn syrups. The latter are produced by hydrolysis of starch to a specified carbohydrate content utilizing weak acid solutions or acid/enzyme solutions. One low D.E. glucose solids product which is suitable for use in the present invention is that commercially sold under the trademark "Casco Glucose Solids, Code 1922," by the Canada Starch Company Ltd. This is a pure white powdered carbohydrate produced by spray drying a low conversion glucose corn syrup and has the following typical analysis:

| | |
|---|---|
| Percent moisture | 3.5. |
| Percent total solids | 96.5 |
| Dextrose equivalent | 24–28%. |
| pH (50% solution) | 4.5. |
| Sulfur dioxide p.p.m. | 40 maximum. |
| Percent ash | 0.3. |
| Percent protein | 0.04. |
| Sieve analysis | 97% through 100 mesh. |

Carbohydrate composition dry basis

| | Percent |
|---|---|
| Mono-saccharide | 9.5 |
| Di-saccharide | 9.2 |
| Tri-saccharide | 10.3 |
| Tetra-saccharide | 8.4 |
| Penta- and higher sugars | 62.6 |
| | 100.0 |

Another low D.E. glucose solids product which has been found satisfactory for use in the present invention is that which is commercially available under the trademark "Star-Dri 24" Corn Syrup Solids, manufactured and sold by the A. E. Staley Manufacturing Company. This product is made by dehydrating corn syrup which has a specific carbohydrate content produced by acid-enzyme treatment and has the following typical chemical and physical data:

| | |
|---|---|
| Degree of conversion | Very low |
| Type of conversion | Acid-enzyme |
| Dextrose equivalent (D.E.), percent | 26 |
| Fermentable extract (F.E.), percent | 22 |
| Saccharide distribution, percent: | |
|    Dextrose | 5 |
|    Maltose | 14 |
|    Maltotriose | 14 |
|    Higher saccharides | 67 |
| Total solids | 96.5 |
| Moisture | 3.5 |
| pH (50% solution) | 5.0 |
| Ash (sulphated) | 0.3 |
| Bulk density, lb./cu. ft. | |
|   STAR-DRI 24R (regular) | |
|     Packed | 38 |
|     Loose | 30 |
|   STAR-DRI 24F (fine) | |
|     Packed | 39 |
|     Loose | 31 |
| Screen Analysis: | |
|   STAR-DRI 24R (regular), percent: | |
|     On U.S. #100 | 15 |
|     On U.S. #200 | 30 |
|     Thru U.S. #200 | 70 |
|   STAR-DRI 24F (fine), percent | |
|     On U.S. #100 | 0 |
|     On U.S. #200 | 22 |
|     Thru U.S. #200 | 78 |

In the coating composition of this invention, the aqueous syrup may comprise from 60% to 85% sugar solids. Preferably the solution contains 76%–80% sugar solids, and in an especially preferred embodiment of the invention, the syrup solution used contains about 80% by weight of sugar solids. The sugar solids may comprise from about 80% to about 68% by weight sucrose solids and from about 20% to about 32% by weight of low D.E. glucose solids. Preferably the sugar solids are made up of 75% by weight sucrose solids and 25% by weight of low dextrose equivalent (D.E.) glucose solids.

By employing low dextrose equivalent glucose solids in an amount of from 20%–32%, and preferably 25% by weight of the total sugar solids of the coating composition, we have found that a higher than ordinary proportion of sugar coating to cereal base may be used without the end product being unpalatable due to excessive sweetness.

Figure 2:
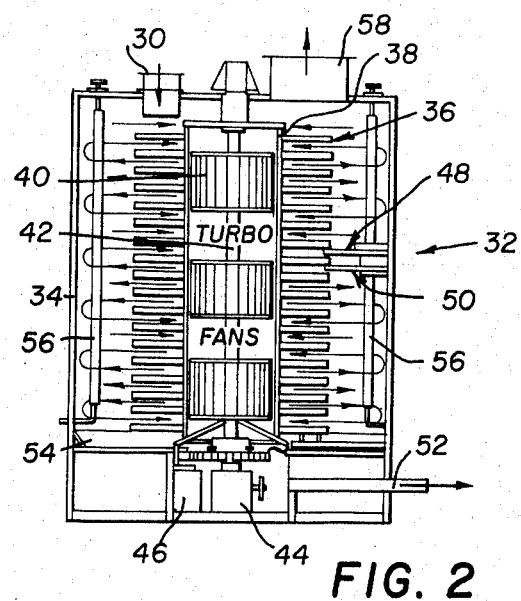

We shall now describe the invention more particularly, in terms of a specific embodiment, and with reference to the drawings which illustrate representative apparatus which may be employed in carrying out the cereal coating process of the invention. In the drawings:

FIG. 1 is a schematic illustration of apparatus used in applying the coating to the cereal particles; and FIG. 2 is an elevation, in section, of the apparatus used for drying the candy coated cereal particles.

The first step in the coating operation is the preparation of the syrup. A normal batch size is 625 lbs., consisting of 400 lbs. sugar, 100 lbs. low DE glucose solids and 125 lbs. water. The ingredients are placed in a steam jacketed stainless steel kettle equipped with agitator and heated to 180° F. When this temperature is reached the solution is then pumped through a heat exchanger, the hot end of which is at 240° F. and the cold end of which is at 180° F. The syrup is continuously circulated through the heat exchanger until both the hot and cold ends stabilize at their respective temperatures (240° and 180° F.). This normally requires a period of about 30 minutes ±5 minutes, for the batch size, proportions of ingredients, stated above, and the particular equipment we use for this purpose. However, the length of time during which the syrup solution is cycled through the heat exchanger is variable, since it depends upon a number of factors, such as the particular equipment used, syrup solids content, intake product temperature, steam pressure, etc. At this point the syrup solution is considered to be conditioned, i.e., the sugar and glucose solids are in the most minute state without caramelizing. The syrup solution is then pumped into a stainless steel steam jacketed holding kettle and held at 180° F. under agitation. Of course, the amounts of ingredients, and to some extent the proportions used as well, need not be those specified above; any desired amounts of sucrose solids and low DE glucose solids and water may be used in making up the syrup solution, as long as the prepared solution contains 60%–85% by weight of sugar solids, and the latter are comprised of 68%–80% by weight sucrose solids and 20–32% by weight low D.E. glucose solids.

The heat exchanger used, which may be referred to as a votator, may be any of a variety of commercial heat exchangers designed for the food industry. One specific type which has been found satisfactory is a Swept Surface Heat Exchanger (Model 2BD–648P) manufactured by Creamery Package, Division of St. Regis, Chicago, Illinois. The combination mixer-heat exchanger known under the trade name "Votator" and manufactured by Chemtron Corp. is also satisfactory for the purposes of the present invention.

Referring now to FIG. 1 of the drawings, from the holding kettle 4 the syrup solution is pumped by means of circulating pump 6 through a coating circulating line 10, from the extremity of which a vari-speed pump 8 bleeds off the exact amount per minute to be fed into the coating drum 12, the excess syrup being pumped back to the holding tank. That is to say, a continuous flow of conditioned syrup solution is circulated into and out of the holding kettle.

The required coating syrup, at a temperature of about 180° F., is pumped through a horizontal stainless steel intake pipe 14 having seven consecutively drilled holes in the bottom. Pipe 14, which is connected to the end of syrup line 11, protrudes wholly into the upper portion of the coating drum intake 16. The cereal pieces are fed simultaneously into the bottom portion of the coating drum 12 by means of a vibratory feeder 18. The syrup solution is deposited gravitationally onto the cereal pieces.

A suitable vibratory feeder for supplying the cereal particles to the coating drum is that known as the "Syntron" feeder. ("Syntron" is a trade name.) This is a well known type of feeder, and consists of a feeding chute caused to vibrate by means of the oscillating armature of an electromagnetic device anchored to the main frame. A rheostat or equivalent device is provided for adjusting the current input, thereby controlling the pull of the electromagnet and thus the length of stroke; in this way the capacity of the feeder, or, stated another way, the flow of material, is adjusted to any given volume and/or weight per minute.

Although in a preferred embodiment of the invention the intake pipe or feed line 14 through which the syrup is fed into drum 12 is provided with seven consecutively drilled holes in the bottom, it will be understood that the number of holes or orifices in this pipe may be varied. It is necessary, however, that several such holes or orifices be provided in order to ensure a proper distribution of syrup onto the incoming cereal particles in the drum.

As aforesaid, the aqueous syrup drops gravitationally through a plurality of consecutively placed orifices in the syrup feed line onto the flow of cereal. This method effects a random or percentage coating of the cereal in-flow. Complete coating coverage of the cereal pieces is achieved with the rotation of drum 12 and the cereal pieces therewithin, so that syrup on overcoated pieces of cereal is transmitted to undercoated pieces before the cereal reaches the discharge end 20 of the drum. No heat is applied during the coating process.

The rotating coating drum 12 (FIG. 1) is approximately 10 feet long by 2 feet in diameter and is provided with three (3) spiral flights 24 secured to the inner surface of the drum wall and extending longitudinally of said drum, the flights having a pitch of approximately 30° towards the discharge end (shown in dotted lines in FIG. 1). The flights carry the coated product around the inside periphery of the drum while the pitch carries the product towards the discharge end 20 of the drum, both actions enabling the transmission of syrup from one cereal piece to another so that an even distribution of coating is achieved. A suitable coating drum for use in carrying out the process of the present invention is the Manley Coater (Model 2070) manufactured by Manley, Inc., Kansas City, Mo.; however, it is to be understood that other coating apparatus may also be used.

The coating drum may be permanently installed in one position or (as shown in FIG. 1) may be movable, in which event drum 12 is mounted on a suitable platform 26 equipped with means for rollably moving the assembly, such as wheels or casters 28.

The discharged wet-coated product is carried by a conveyor belt equipped with an automatic belt washer (not shown), to the top side intake 30 (see FIG. 2), of a vertical turbo dryer.

To effect drying of the coated cereal particles, we subject the particles to a temperature of 200°–260° F. for a period of from about 20 to about 28 minutes, and at the same time subject the coated product to a great deal of agitation throughout the drying stage. Any dryer which can provide for substantial agitation of the contents during the drying stage can be used; however, we have found that one dryer which is particularly effective for the purposes of the present invention is a vertical turbo dryer, illustrated in FIG. 2, such as that known as the "Wyssmont Model SR–20 Dryer" (trademark).

Referring now to FIG. 2 of the drawings, the "Wyssmont Model SR–20" dryer is a vertical cylindrical gas-fired turbo dryer, designated by the numeral 32 in FIG. 2. Within the cylindrical housing 34 is mounted a set of segmented trays or shelves 36, each of which resembles a doughnut shaped pie plate with each tray section resembling a pie wedge. These trays are superimposed in a framework, which we shall refer to as the tray rotor 38 that revolves slowly within housing 34. Tray rotor 38 consists of an array of about 20 of the annular trays 36 in the center of which a plurality of turbo fans 40 revolve to circulate air over the trays. Turbo fans 40 are mounted on a central shaft 42 which is driven by a suitable prime mover 44. Tray rotor 38 is driven by a second, separate prime mover 46. The wet material (in this case syrup coated cereal particles) enters dryer 32 at the top through intake 30 and falls onto the top shelf or tray as it rotates beneath the feed opening. After one revolution (approximately 1½ minutes) the material is pushed or wiped by a stationary wiper 48 through radial slots (not shown) to the tray below. Material fed to the top tray (and to each succeeding tray) is leveled by a suitable leveling device 50. The action is repeated on each tray as the material progresses downwardly through the dryer until the dry material is discharged from the bottom tray via conduit 52 onto a conveyor (not shown) whence it is passed to packaging or to storage.

As shown in FIG. 2, a stream of preheated air e.g., manifold heated air (450° F.) enters dryer 32 via duct 54 at the base of the dryer, and circulates through the dryer following a tortuous path as shown by the arrows X. The air passes across each tray 36 radially and into contact with internal gas-fired heaters 56 arranged within the dryer adjacent the periphery of housing 34; and is recirculated. After circulating through the dryer, the air, laden with moisture extracted from the material on the trays with which it has been in contact, is exhausted through duct 58 at the top of the dryer. As to the rate at which the heated air is circulated through the dryer, this may be varied to some extent, depending upon the temperatures maintained in the dryer, the type of dryer used, the length of drying time, the moisture content of the syrup coating on the cereal particles, etc., as will be apparent to those skilled in the art. We have found that a satisfactory rate of circulation of the preheated air into a "Wyssmont Model SR–20" turbo dryer is 2290 c.f.m.

It is essential in the present invention, that after coating of the cereal particles is completed, the coated product be subjected, at least initially, to a substantial amount of heat in order to maintain the gloss on the product and also to attain complete separation of the cereal particles during the drying stage. By a "substantial amount of heat," in this context, we means a temperature of at least 200° F. Since exposure of candy coated cereal particles to elevated temperatures for prolonged periods of time can result in damage to the product, such as by causing caramelizing of the coating, it is necessary that such exposure to elevated temperatures during drying be as short as possible, consistent with the requirement for drying of the syrup to a hard, transparent, glossy candy coating with a low moisture content (about 2–3%). This is achieved by carrying out the drying in a vertical turbo dryer as described above. The circulation of heated air over the revolving trays causes some agitation, but most of the agitation of the cereal particles is effected by the 20 consecutive drops through radial slots from one tray to the next, as the coated cereal passes from the top to the bottom of the dryer. Regardless, however, of the amount of agitation, even to the point of product breakage, the high content of non-sucrose solids in the sugar syrup suppresses any tendency to crystallization, either during drying, or after drying is completed.

The temperature at which the drying is carried out ranges, as aforesaid, from about 2000° F. to about 260° F., with the upper portion of the dryer being maintained, desirably, at a temperature within the range of 220° F. to 260° F. and the lower portion of the dryer being maintained at a temperature of from about 200° F. to about 250° F. The drying time is from about 20 to about 28 minutes, and preferably is approximately 26 minutes, based on a dryer output of 1300 lb./hour of dry coated cereal particles having a final moisture content of 2%.

By the process of the present invention, as described above, we have provided a hard, transparent cereal candy coating which does not crystallize and become white or frosted during drying, and furthermore is not hygroscopic, i.e. it does not become sticky even when exposed to very humid atmospheres. The cereals so coated may therefore be packaged without the necessity of providing humidity controls or special moisture-resistant materials. For instance, cereals coated according to our invention may be packaged in an ordinary cardboard cereal carton having a waxed paper liner without danger that the product will become sticky and agglomerate. It is not necessary to use special and expensive moisture vapor proofing materials such as aluminum foil-laminated paper such as has been employed hitherto as an overwrap for the package. This results in substantial savings in packaging costs for candy coated cereals.

Although our invention has been described in detail with reference to a particular embodiment, it will be apparent to those skilled in the art that variations and modifications in processing conditions and/or equipment, or in materials employed in making up the coating composition, are possible. It is to be understood, then, that the present invention is not to be limited to what has been particularly described herein: our intention is that the invention cover all embodiments as may fall within the ambit of the claims which follow.

We claim:
1. A cereal coating process which comprises the steps, in sequence, of
   (a) applying to cereal particles a preheated aqueous syrup solution comprising 60%–85% by weight of sugar solids, in which the sugar solids are comprised of 80%–68% by weight, on a dry basis, of sucrose solids and 20%–32% by weight, on a dry basis, of glucose solids having a dextrose equivalency of 15%–28%, based on the total weight of said glucose solids; and
   (b) drying the coated cereal particles at a temperature and for a time such that discrete cereal particles, each having a glossy, non-hygroscopic, transparent candy coating, are obtained while simultaneously vigorously agitating said particles throughout the drying step.

2. A process as set forth in claim 1, wherein the cereal particles are coated with an aqueous syrup solution comprising 80% by weight of sugar solids.

3. A process as set forth in claim 2, in which the sugar solids are comprised of 75% sucrose solids and 25% glucose solids having a dextrose equivalency of 15%–28%, based on the total weight of glucose solids, said percentages of said sucrose solids and glucose solids being by weight, on a dry basis, of the total sugar solids.

4. A process as set forth in claim 3, wherein the glucose solids have a dextrose equivalency of 24%–28%, based on the total weight of said solids.

5. A process as set forth in claim 1, in which the drying step is effected at a temperature in the range of 200° F.–260° F. and for a time of from about 20 to about 28 minutes.

6. A process as set forth in claim 1 wherein, prior to the coating step, the aqueous syrup solution is preheated to a temperature within the range of 180°F.–240°F.

7. A process as set forth in claim 1, in which the glucose solids have a dextrose equivalency of 24%–28%, based on the total weight of said solids.

8. A process as set forth in claim 1, wherein the coating of the cereal particles is effected in a rotating coating drum, said aqueous syrup solution and said cereal particles being fed simultaneously into said drum.

9. A process as recited in claim 8, wherein the aqueous syrup solution being fed into the drum is allowed to fall by means of gravity onto the incoming cereal particles.

10. The process of claim 9, wherein the aqueous syrup solution is pumped into the upper portion of the coating drum through a horizontally disposed feed line projecting thereinto, in the bottom of which line are a plurality of consecutively placed orifices; and the cereal particles are fed into the lower portion of said coating drum; said syrup solution falling by means of gravity through said orifices onto said cereal particles as the latter move forwardly through the drum.

11. The process of claim 10 wherein the coated cereal particles are rotatably conveyed through the drum from the intake end thereof toward its discharge end, by means of spiral flights secured to the inner surface of the wall of said drum and extending longitudinally of the drum, whereby syrup is transmitted from one cereal particle to another as the cereal particles pass through said drum, thereby to achieve an even distribution of the coating on said cereal particles.

12. A process as set forth in claim 1, in which the drying step is carried out in a vertical turbo dryer.

13. A cereal coating composition comprising an aqueous syrup solution containing 60%–85% by weight of sugar solids, the balance being water; said sugar solids being comprised of 80%–68% by weight, on a dry basis, of sucrose solids and 20%–32% by weight, one a dry basis, of glucose solids having a dextrose equivalency of 15%–28%, based on the total weight of said glucose solids.

14. The composition of claim 13, wherein the aqueous solution contains 80% by weight of sugar solids.

15. The composition of claim 13, wherein the sugar solids are comprised of 75% sucrose solids and 25% glucose solids having a dextrose equivalency of 15%–28%, based on the total weight of glucose solids, said percentages of said sucrose solids and glucose solids being by weight, on a dry basis, of the total sugar solids.

16. The composition of claim 15, in which the glucose solids have a dextrose equivalency of 24%–28%, based on the total weight of said solids.

17. The composition of claim 13 in which the glucose solids have a dextrose equivalency of 24%–28%, based on the total weight of said solids.

18. The composition of claim 13, wherein the sucrose solids consist essentially of fine grandulated sucrose.

19. A process for preparing a cereal coating composition which comprises:
forming an aqueous syrup solution by mixing together with heating, sugar solids comprised of 80%–68% by weight of sucrose solids and 20%–32% of glucose solids having a dextrose equivalency of 15%–28%, based on the total weight of said glucose solids, and sufficient water to make up an aqueous syrup solution containing 60% to 85% by weight of said sugar solids; and
conditioning said syrup solution by continuously cycling it through a heat exchanger, one zone of which is at a temperature of about 180° F. and another zone of which is at a temperature of about 240° F., thereby to obtain a clear transparent coating.

20. A process as set forth in claim 19 wherein, in making up the aqueous syrup solution, the mixture of sugar solids and water is heated to about 180° F.

21. A process as set forth in claim 19 wherein, following the conditioning step, the syrup solution is maintained at a temperature of about 180° F. until used.

22. A process set forth in claim 19 wherein the syrup solution is continuously cycled through said heat exchanger for a time of about 30±5 minutes.

23. A process as set forth in claim 19 wherein the sugar solids are comprised of 75% sucrose solids and 25% glucose solids having a dextrose equivalency of 15%–28%, based on the total weight of glucose solids, said percentages of said sucrose solids and glucose solids being by weight, on a dry basis, of the total sugar solids.

24. A process as set forth in claim 23 wherein the glucose solids have a dextrose equivalency of 24%–28%, based on the total weight of said solids.

References Cited

UNITED STATES PATENTS

| | | | |
|---|---|---|---|
| 2,824,009 | 2/1958 | Lindow | 99—83 X |
| 2,868,647 | 1/1959 | Vollink | 99—83 |
| 3,318,706 | 5/1967 | Fast | 99—83 |

RAYMOND N. JONES, Primary Examiner

U.S. Cl. X.R.

426—380, 214, 459

UNITED STATES PATENT AND TRADEMARK OFFICE
CERTIFICATE OF CORRECTION

PATENT NO. : 3,792,183
DATED : February 12th, 1974
INVENTOR(S) : Angus A. Lyall et al It is certified that error appears in the above-identified patent and that said Letters Patent are hereby corrected as shown below:

Column 1, line 18, change "dry" to --drying--; line 51, change "hydroscopic" to --hygroscopic--.

Column 2, line 65, change "hydroscopic" to --hygroscopic--.

Column 3, line 68, change "now" to --low--.

Column 4, line 40, after "Total solids" insert --, percent--; line 41, after "Moisture" insert --, percent--; line 43, after "Ash (sulphated)" insert --, percent--.

Column 7, line 43, change "means" to --mean--; line 64, change "2000°F" to --200°F--.

Column 9, line 21, change "one" to --on--.

Column 9, line 40, change "grandulated" to --granulated--.

Signed and Sealed this twelfth Day of July 1977

[SEAL]

Attest:

RUTH C. MASON
*Attesting Officer*

C. MARSHALL DANN
*Commissioner of Patents and Trademarks*